United States Patent
Koyano (10) Patent No.: US 8,264,742 B2
(45) Date of Patent: Sep. 11, 2012

(54) INFORMATION PROCESSING APPARATUS, RECORDING METHOD, AND COMPUTER-READABLE STORAGE MEDIUM

(75) Inventor: Hiroki Koyano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 12/401,472

(22) Filed: Mar. 10, 2009

(65) Prior Publication Data

US 2009/0231626 A1 Sep. 17, 2009

(30) Foreign Application Priority Data

Mar. 11, 2008 (JP) ................. 2008-061287

(51) Int. Cl.
*G06K 15/00* (2006.01)
*G06K 1/00* (2006.01)
(52) U.S. Cl. ....................... 358/1.9; 358/1.14
(58) Field of Classification Search ................. 358/3.28, 358/1.9, 501, 401, 1.14; 347/102, 42, 19
See application file for complete search history.

(56) References Cited

U.S. PATENT DOCUMENTS

| | | | | |
|---|---|---|---|---|
| 2004/0001133 A1* | 1/2004 | Critelli et al. | ................. | 347/101 |
| 2006/0209326 A1* | 9/2006 | Higashiura | ................. | 358/1.9 |
| 2007/0035774 A1* | 2/2007 | Kubo | ................. | 358/3.28 |
| 2007/0211100 A1* | 9/2007 | Mizutani et al. | ................. | 347/19 |
| 2008/0170269 A1* | 7/2008 | Kaneko et al. | ................. | 358/3.28 |
| 2008/0211866 A1* | 9/2008 | Hill | ................. | 347/42 |
| 2009/0109457 A1* | 4/2009 | Koyano | ................. | 358/1.9 |
| 2009/0225143 A1* | 9/2009 | Fukui | ................. | 347/102 |
| 2009/0303504 A1* | 12/2009 | Iinuma et al. | ................. | 358/1.9 |
| 2011/0170145 A1* | 7/2011 | Govyadinov et al. | ................. | 358/3.28 |

FOREIGN PATENT DOCUMENTS

JP 03-234670 A 10/1991
JP 2004-102008 A 4/2004

* cited by examiner

*Primary Examiner* — Jerome Grant, II
(74) *Attorney, Agent, or Firm* — Canon USA Inc. IP Division (57) ABSTRACT

A recording method includes providing setting of recording with a special-color recording material in a designated region of a sheet; determining whether the designated region with the special-color recording material setting is a region in which printing is performed; recording the special-color recording material to the designated region determined such that the printing is performed, in accordance with the setting; and canceling the setting of the designated region determined such that the printing is not performed.

15 Claims, 10 Drawing Sheets

— APPLICATION FORM —

APPLICATION DATE: XXXXXXXXXX  402
APPLICANT: XXXXX  CLEAR TONER PROCESS SETTING...

| APPLICATION ITEM | REASON |
|---|---|
| XXXXXXXXX | XXXXXXXXX |
| XXXXXXXXX | XXXXXXXXX |
| XXXXXXXXX | XXXXXXXXX |

| MANAGER | ASSISTANT MANAGER | WRITER |
|---|---|---|
| xxx | xxx | xxx |

403

CLEAR TONER PROCESS SETTING

☒ EXECUTE CLEAR TONER PROCESS

— CLEAR TONER PROCESS RANGE —

○ ALL FIELD GRAPHICS
● SELECTED FIELD GRAPHIC

| ☒ APPLICATION DATE ▲ |
| ☐ APPLICANT |
| ☐ APPLICATION ITEM (1) |
| ☐ APPLICATION ITEM (2) ▼ |

( OK )  ( CANCEL )

INFORMATION PROCESSING APPARATUS, RECORDING METHOD, AND COMPUTER-READABLE STORAGE MEDIUM

BACKGROUND OF THE INVENTION

1. Field of the Invention

The present invention relates to overlay printing in which a form created by a form creating device and data in text format are overlaid and printed.

2. Description of the Related Art

Since a business system of a corporation may become a large-scale system, the number of forms and the type of forms used for overlay printing increases.

Also, in order to prevent an unauthorized user from revising the print content in a specific region of a print after overlay printing is performed on a form, exclusion control of an editing operation is executed only when necessary.

In general, exclusion control is control for access and updating of a specific file or specific data. In particular, when writing is performed on a file or a database, the exclusion control temporarily limits access to data or reading and writing of data so as to secure data consistency.

Here, the exclusion control of the editing operation represents control for processing a print to prevent an unauthorized user from revising a print after printing.

To meet demand, the exclusion control is applied to the entire print to prevent revising of the print after printing such that overlay printing is performed using "a dedicated sheet" such as a coated sheet, or that a sheet is entirely processed by laminating after overlay printing.

Meanwhile, as a related technique, there is a printing technique using a clear (transparent) recording material which is a special-color recording material as follows.

The clear (transparent) recording material does not contain a pigment and adds a colorless and transparent image.

Hereinafter, the clear (transparent) recording material is referred to as a clear toner.

For example, Japanese Patent Laid-Open No. 03-234670 discloses a technique that prevents data from being tampered by duplication or the like, by applying a mark with a semi-transparent color material on an image of an ID card or a bank cash card such that the image is not completely covered with the mark.

In addition, Japanese Patent Laid-Open No. 2004-discloses a certificate issuing apparatus that issues a certificate, such as a bill or a check. The apparatus provides a technique capable of printing print items with a transparent fluorescent toner on a face of the certificate, thereby issuing a simple, low-cost, and high-security certificate.

Further, there is another technique as follows which is different from the above-described technique of printing a mark or a character with a clear recording material to prevent data from being tampered.

For example, Japanese Patent Laid-Open No. 2004-provides a separation sheet in which a separation layer is formed on a sheet base surface of, for example, a security or a magnetic card. The size and shape of the separation layer are desirably changed depending on an image, a character, and symbol data.

The separation layer is formed on the sheet base surface by plateless printing.

The clear recording material is typically used as described above.

Since the business system becomes a large-scale system and printing is massively performed, more dedicated sheets or lamination films are used, and hence, printing costs may increase.

Also, by frequently switching the type of sheets for overlay printing, performance of the system may be reduced.

In addition, since the control for overlay printing and the control for laminating are provided, the system may become complicated, and hence, maintenance costs may increase.

These disadvantages are becoming noticeable.

SUMMARY OF THE INVENTION

The present invention provides exclusion control of an editing operation only in a necessary region in a sheet by performing recording only at the necessary region with a special-color recording material.

According to an aspect of the present invention, a recording method is provided which includes providing setting of recording with a special-color recording material in a designated region of a sheet; determining whether the designated region with the special-color recording material setting is a region in which printing is performed; recording the special-color recording material to the designated region determined such that the printing is performed, in accordance with the setting; and canceling the setting of the designated region determined such that the printing is not performed.

With the configuration, the exclusion control can be provided only at the necessary region in the sheet by performing recording only at the necessary region with the special-color recording material.

The necessary region is a region where it is desired to prevent the editing operation such as revising of the sheet by an unauthorized user.

Even in the region with the special-color recording material setting, by determining and canceling the special-color recording material setting in a region other than the necessary region, the special-color recording material setting can be easily provided only in the necessary region.

Accordingly, since recording with the special-color recording material is performed only in the necessary region, consumption of the special-color recording material, such as a toner or an ink, can be reduced.

Further features of the present invention will become apparent from the following description of exemplary embodiments with reference to the attached drawings.

DESCRIPTION OF THE EMBODIMENTS

An embodiment of the present invention is described below with reference to the attached drawings.

In the present embodiment, an overlay printing technique is used in which a form created by a form creating device and data in text format are overlaid and printed.

First, typical overlay printing is described.

Overlay printing uses a function called page registration or form registration of a page printer, such as a laser printer.

This printing method is used for creation of a form.

For example, frame borders of copy paper in the form are registered as form information.

Using the page printer, the form information is printed with data in text format (field data). At this time, using a function of page information calling or form information calling, the form and the field data are overlaid and printed.

Such printing defines overlay printing.

The form information is generated by using a dedicated form information design system.

The form information typically includes a fixed graphic (form graphic) not relying on the field data, and a graphic (field graphic) in which the received field data is displayed in accordance with a designated output format.

Figure 1:
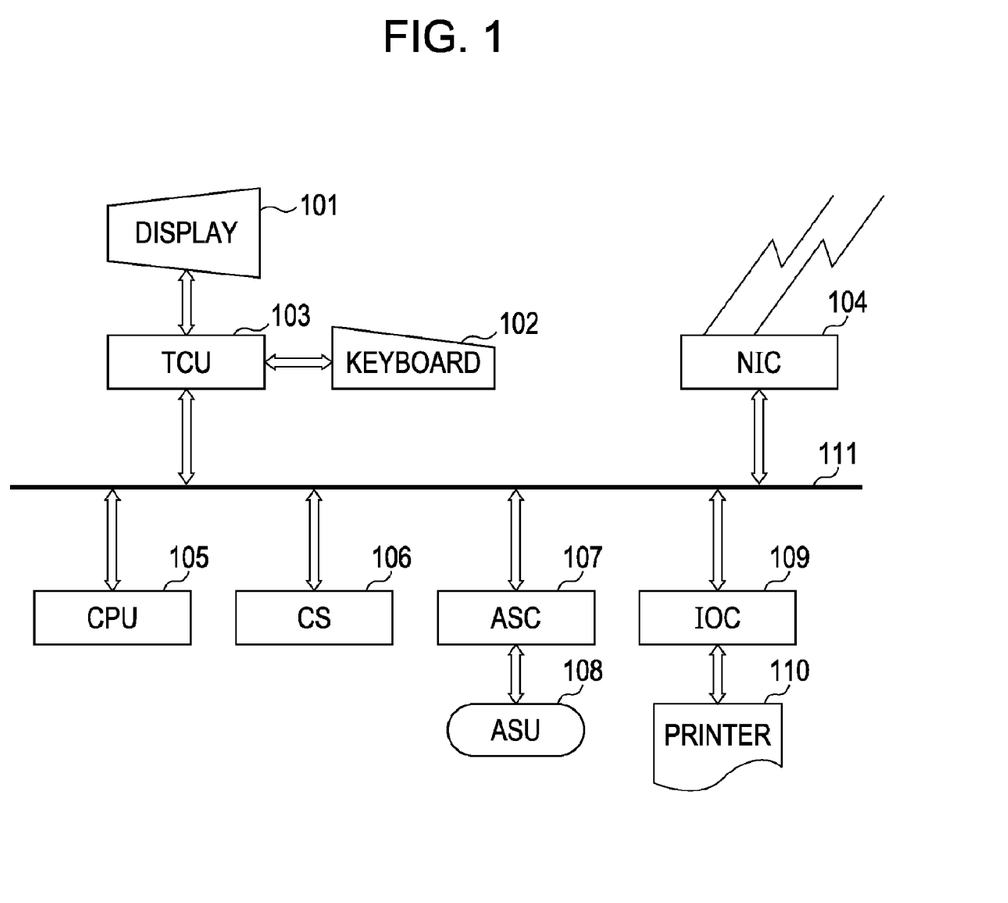
FIG. 1 is a block diagram showing a computer system in which a form information design system and an overlay printing system are operated.

FIG. 1 is a block diagram showing a computer system in which the form information design system and the overlay printing system are operated.

Referring to FIG. 1, a central processing unit (CPU) 105 controls the operation of the apparatus under a control program stored in a central storage (CS) 106.

The CS 106 also stores an application program loaded from an auxiliary storage unit (ASU) 108 via an auxiliary storage controller (ASC) 107.

The CS 106 further stores a program which causes the computer system to be operated as the form information design system and the overlay printing system.

The control program and various application programs of the CS 106 are operated by instructions from first and second devices as follows.

The first device is an operator console including a display 101, a keyboard 102, and a terminal control unit (TCU) 103.

The second device is a network interface controller (NIC) 104 that causes the computer system to acquire instruction information from an auxiliary computer system connected to the NIC 104 via a network, such as LAN or WAN.

A printer 110 is connected to the computer system of this embodiment via an input output controller (IOC) 109. The form information input from the computer system is previously stored in a memory of the printer 110.

Figure 10:
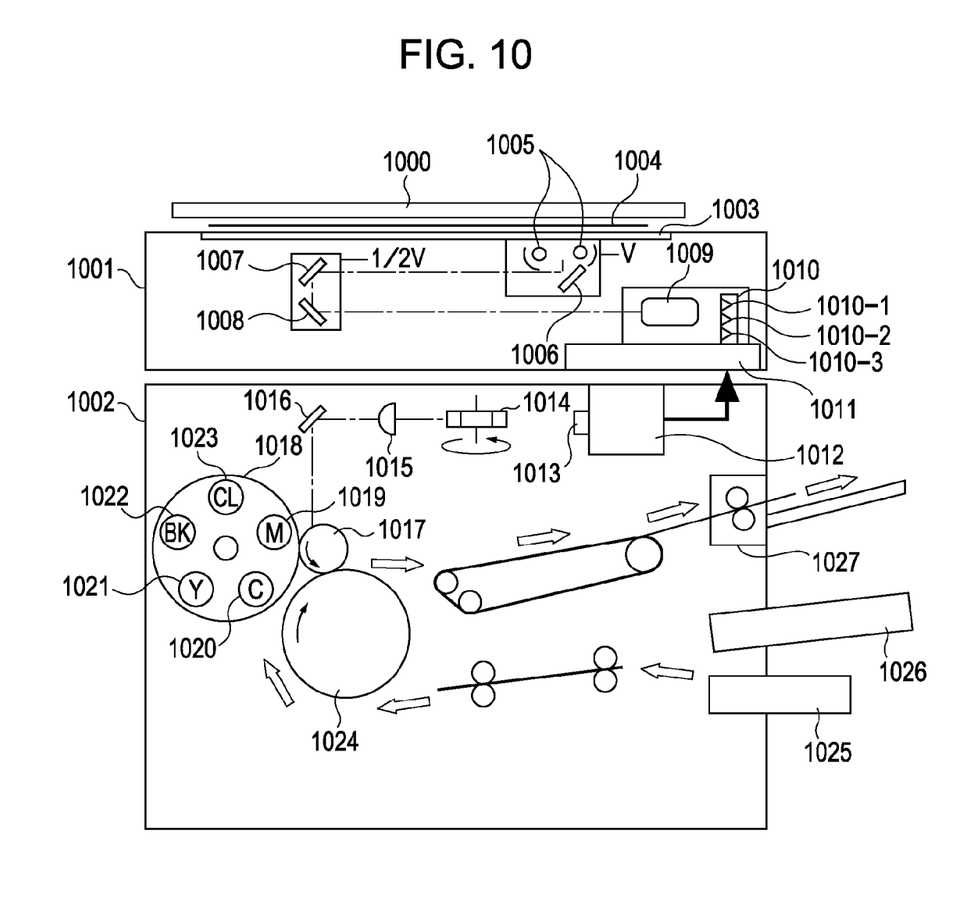
FIG. 10 illustrates a printer.

The printer 110 is an image processing device as shown in FIG. 10 capable of adding (recording) a special-color recording material onto a recording sheet.

The printer 110 generates an overlay pattern by overlaying data in text format input from the computer system and the form generated on the basis of the form information previously registered in the memory. Thusly, overlay printing is performed.

A system bus 111 is a path through which data and a program command are transferred among the TCU 103, the CPU 105, the CS 106, the ASC 107, and the IOC 109.

FIG. 10 shows the printer 110 in detail.

An image scanner (image reader) 1001 in FIG. 10 reads an original image and performs digital signal processing on the original image.

A printer section 1002 performs full-color printing of an image corresponding to the original image read by the image scanner 1001 on a sheet.

The image scanner 1001 includes a mirror-surface pressure plate 1000. An original document 1004 on an original platen glass (hereinafter, referred to as platen) 1003 is irradiated with a lamp 1005, and the irradiation light is guided by mirrors 1006, 1007, and 1008.

The irradiation light then forms an image on a three-line solid-state image pickup element sensor (hereinafter, referred to as CCD) 1010 by a lens 1009. Hence, three image signals of a red (R) image signal 1010-1, a green (G) image signal 1010-2, and a blue (B) image signal 1010-3, which function as full-color information, are transmitted to a data processing device 1011.

The lamp 1005 and the mirror 1006 are mechanically moved at a speed v, and the mirrors 1007 and 1008 are mechanically moved at a speed ½ v in a direction perpendicular to an electric scanning (main scanning) direction of the line sensor. Hence, the lamp 1005 and the mirrors 1006, 1007, and 1008 scan the entire surface of the original image (sub scanning). Here, the original document 1004 is read with a resolution of 600 dpi (dots/inch) for main scanning and sub scanning.

The read image signals are stored page by page of the original document in a data storage unit provided in the data processing device 1011.

The data processing device 1011 electrically processes the stored image signals pixel by pixel, separates the image signals into components of magenta (M), cyan (C), yellow (Y), and black (Bk), and sends the components to the printer section 1002. Also, the data processing device 1011 generates image data of a special toner, for example, transparent image data (CL) pixel by pixel, and sends the data to the printer section 1002.

The image signals of M, C, Y, BK, and CL are sent to a laser driver 1012.

The laser driver 1012 modulates and drives a semiconductor laser 1013 in accordance with the sent image signals.

Laser light scans a photosensitive drum 1017 via a polygonal mirror 1014, an f-θ lens 1015, and a mirror 1016.

Here, the laser light is written with the same resolution of 600 dpi (dots/inch) for main scanning and sub scanning as the resolution of reading.

A rotary developer 1018 includes a magenta developing device 1019, a cyan developing device 1020, a yellow developing device 1021, a black developing device 1022, and a special-color (clear) developing device 1023. The five developing devices 1019 to 1023 sequentially contact the photosensitive drum 1017. Electrostatic latent images are formed on the photosensitive drum 1017, and the images are developed using toners of the respective colors.

A sheet fed from a sheet cassette 1025 or 1026 is wound around a transfer drum 1024. The developed images on the photosensitive drum 1017 are transferred on the sheet.

After the five-color images of M, C, Y, Bk, and the special-color (clear) are sequentially transferred on the sheet, the sheet passes through a fixing unit 1027, thereby the toners being fixed on the sheet, and then the sheet is outputted.

Alternatively, the sheet may not be outputted at this time. An additional printing with a toner may be performed on the sheet, the toner may be fixed to the sheet, and then the sheet may be outputted. That is, a second printing may be performed after the first printing.

Figure 2:
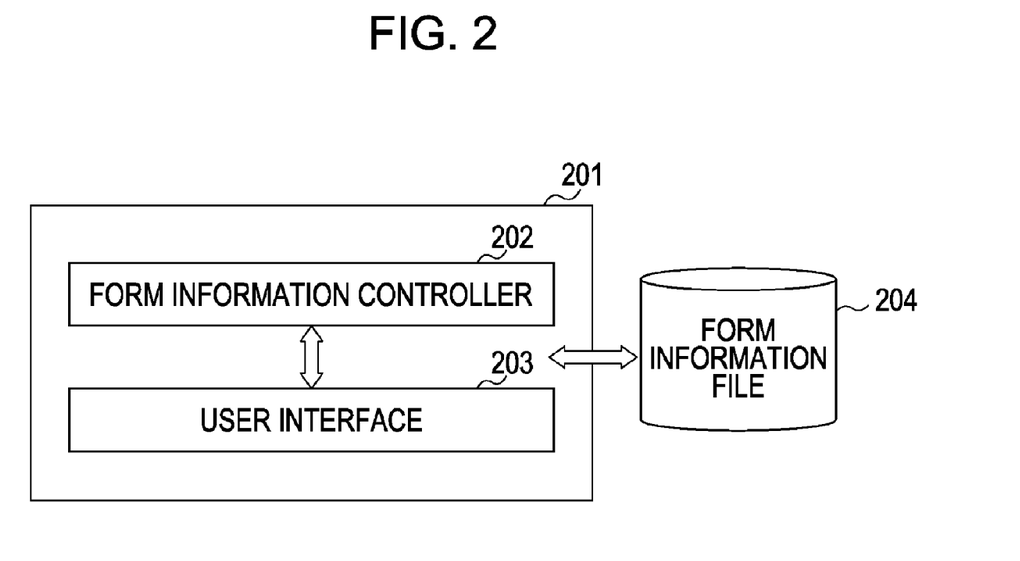
FIG. 2 is a block diagram showing a configuration of the form information design system.

FIG. 2 is a block diagram showing a configuration of a form information design system 201.

When a program to operate the form information design system 201 is loaded on the CS 106 by the CPU 105, the CPU 105 is operated as a form information controller 202 in FIG. 2.

The instruction devices 101 to 103 in FIG. 1 are operated as a user interface 203 in FIG. 2.

The CPU 105 controls the form information controller 202 in the form information design system 201 in accordance with an instruction from the user interface 203.

The form information controller 202 causes the display 101 in FIG. 1 to display a form on the basis of form information of a current design. The form information controller 202 also accepts a setting command of a user input through the user interface 203 and various commands relating to generation of the form information.

The form information controller 202 generates a form information file 204 on the basis of information sent from the user interface 203. This will be described later in more detail.

The file is stored in the ASU 108 in FIG. 1.

The form information controller 202 determines whether or not the user has made an instruction of special-color recording material setting for a field graphic via the user interface 203.

The form information controller 202 also determines whether or not the user has made an instruction for terminating editing of the form or an instruction for executing registration of the form.

Figure 3:
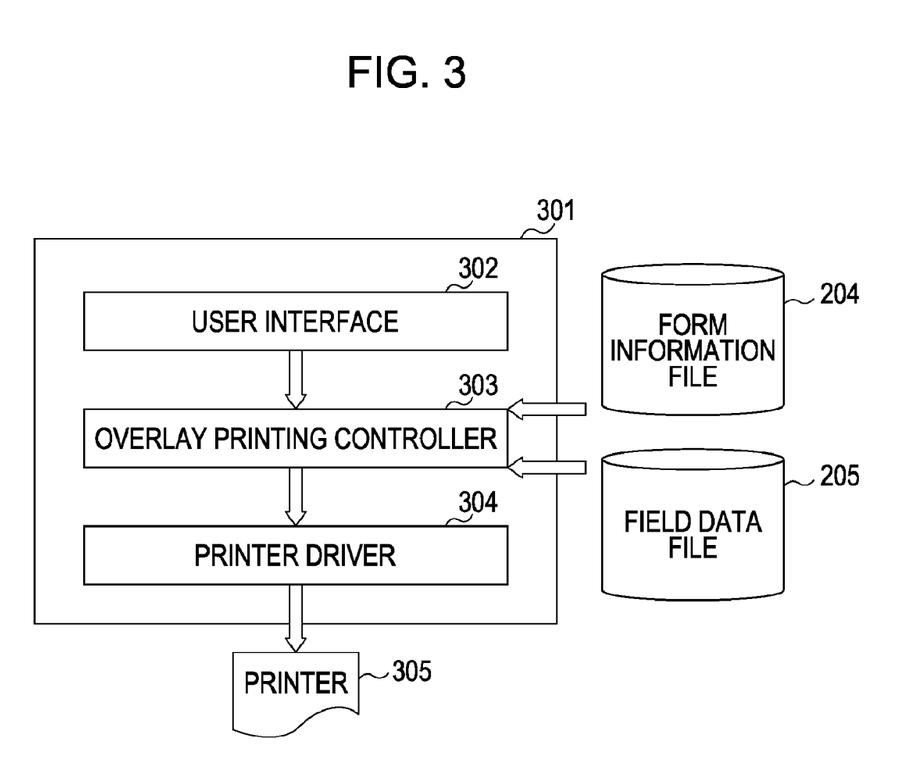
FIG. 3 is a block diagram showing a configuration of the overlay printing system.

FIG. 3 is a block diagram showing a configuration of an overlay printing system 301.

When a program to operate an overlay printing system is loaded on the CS 106 by the CPU 105, the CPU 105 is operated as the overlay printing system 301 in FIG. 3.

Simultaneously, an overlay printing controller 303 and a printer driver 304 are controlled in accordance with an instruction from a user interface 302.

Then, the user interface 302 in FIG. 3 is operated as the instruction devices 101 to 103 in FIG. 1.

The user interface 302 accepts calling of the form information file 204 and the field data file 205 in the ASU 108 in FIG. 1 from the user.

Then, the user interface 302 sends the input to the overlay printing controller 303.

Then, the overlay printing controller 303 causes the display 101 in FIG. 1, which is the user interface 302, to display a list of file names of form information files 204 and field data files 205.

Then, file names selected by the user from the displayed list of the file names are outputted to the overlay printing controller 303.

The overlay printing controller 303 accepts the selected form information file 204 and the selected field data file 205, and reads the files.

Then, the overlay printing controller 303 acquires a form generated on the basis of the form information and the field data from the files.

The overlay printing controller 303 generates printing data in which the two data are overlaid.

When the overlay printing controller 303 generates the above-described printing data, the overlay printing controller 303 also generates the printing data such that a region with the special-color recording material setting is recorded with the special-color recording material.

The overlay printing controller 303 outputs the printing data to a printer 305 via the printer driver 304. The overlay printing controller 303 registers the generated form information on the printer 305.

The special-color recording material may be added (recorded) on the image with the special-color recording material setting when the image is printed by the printer as disclosed in Japanese Patent Laid-Open No. 2003-248360.

The special-color recording material may be a clear toner, or a transparent toner or ink other than the clear toner, as long as the ink or toner provides the same function.

<Creation of Form Information File>

Figure 6:
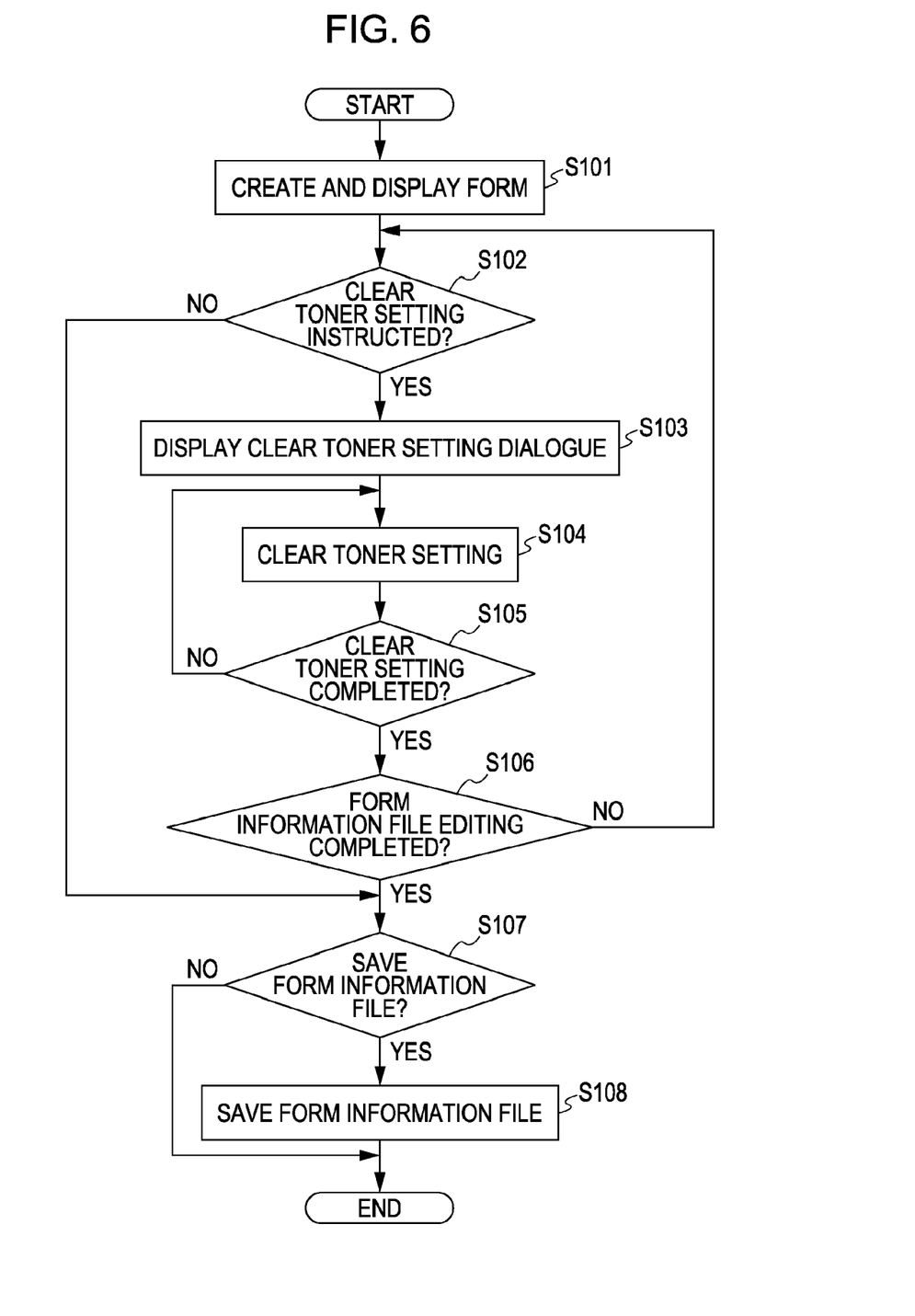
FIG. 6 is a flowchart to generate a form information file according to an embodiment of the present invention.

FIG. 6 is a flowchart showing a procedure of processing to generate the form information file 204 by the form information design system 201 of this embodiment.

First, the user interface 203 accepts designation of a form to be used from the user. Then, the user interface 203 sends the accepted information to the form information controller 202.

Then, the form information controller 202 generates a form information file 204 corresponding to the form on the basis of the sent information.

In step S101, the form information controller 202 creates a form on the basis of the generated form information file 204.

Further, the form information controller 202 controls the user interface 203 to display the created form. The form displayed at the user interface 203 is, for example, a form image 401 in FIG. 4.

In step S102, the user interface 203 receives an instruction from the user whether or not recording with the special-color recording material is performed on each of the field graphics, which are designated regions in the form displayed at the user interface 203.

The user interface 203 which has received the instruction from the user transmits the instruction to the form information controller 202. The form information controller 202 which has received the instruction determines whether or not an instruction of the special-color recording material setting has been made.

Figure 4:
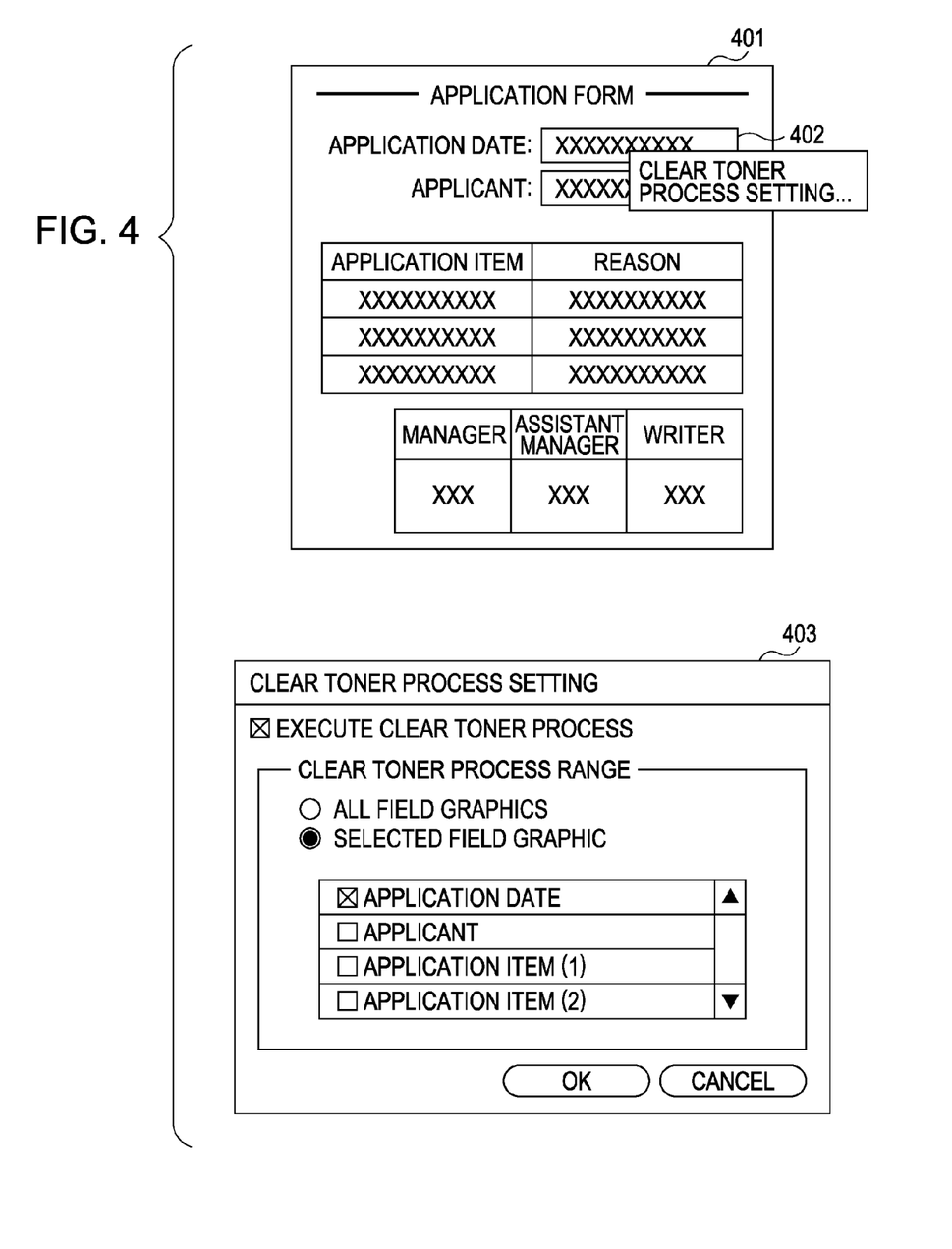
FIG. 4 illustrates an exemplary form displayed via a user interface, and an exemplary special-color recording material setting method for a designated region of the form.

Here, a field graphic 402 in FIG. 4 is a minimum unit in which the special-color recording material setting is provided.

When recording with the special-color recording material is to be performed, that is, when it is determined that the form information controller 202 has provided the special-color recording material setting (YES in step S102), the procedure goes to step S103.

When recording with the special-color recording material is not to be performed, that is, when it is determined that the form information controller 202 has not provided the special-color recording material setting (NO in step S102), the procedure goes to step S107.

In step S103, the form information controller 202 causes the user interface 203 to display a dialogue to be used when the setting of recording with the special-color recording material in the designated region (special-color recording material setting) is provided.

Then, in step S104, the special-color recording material setting (clear toner setting) is provided.

FIG. 4 illustrates an example dialogue 403 to provide the special-color recording material setting.

Step S104 is repeated until the special-color recording material setting is completed (step S105).

In step S106, the form information controller 202 determines whether or not editing of the form information file 204 is completed.

When it is determined that editing of the form information file 204 is not completed (NO in step S106), the procedure returns to step S102. On the other hand, when it is determined that editing of the form information file 204 is completed (YES in step S106), the procedure goes to step S107. In step S107, the form information controller 202 determines whether or not the special-color recording material setting provided in steps S103 and S104 is to be saved in the form information file 204.

Finally, in step S108, when it is determined that the special-color recording material setting is to be saved in the form information file 204, saving is performed.

At this time, saving is performed so that the file name of the form information file input via the user interface corresponds to the special-color recording material setting.

Then, the processing relating to the generation of the form information file 204 is completed.

<Execution of Overlay Printing>

Figure 7:
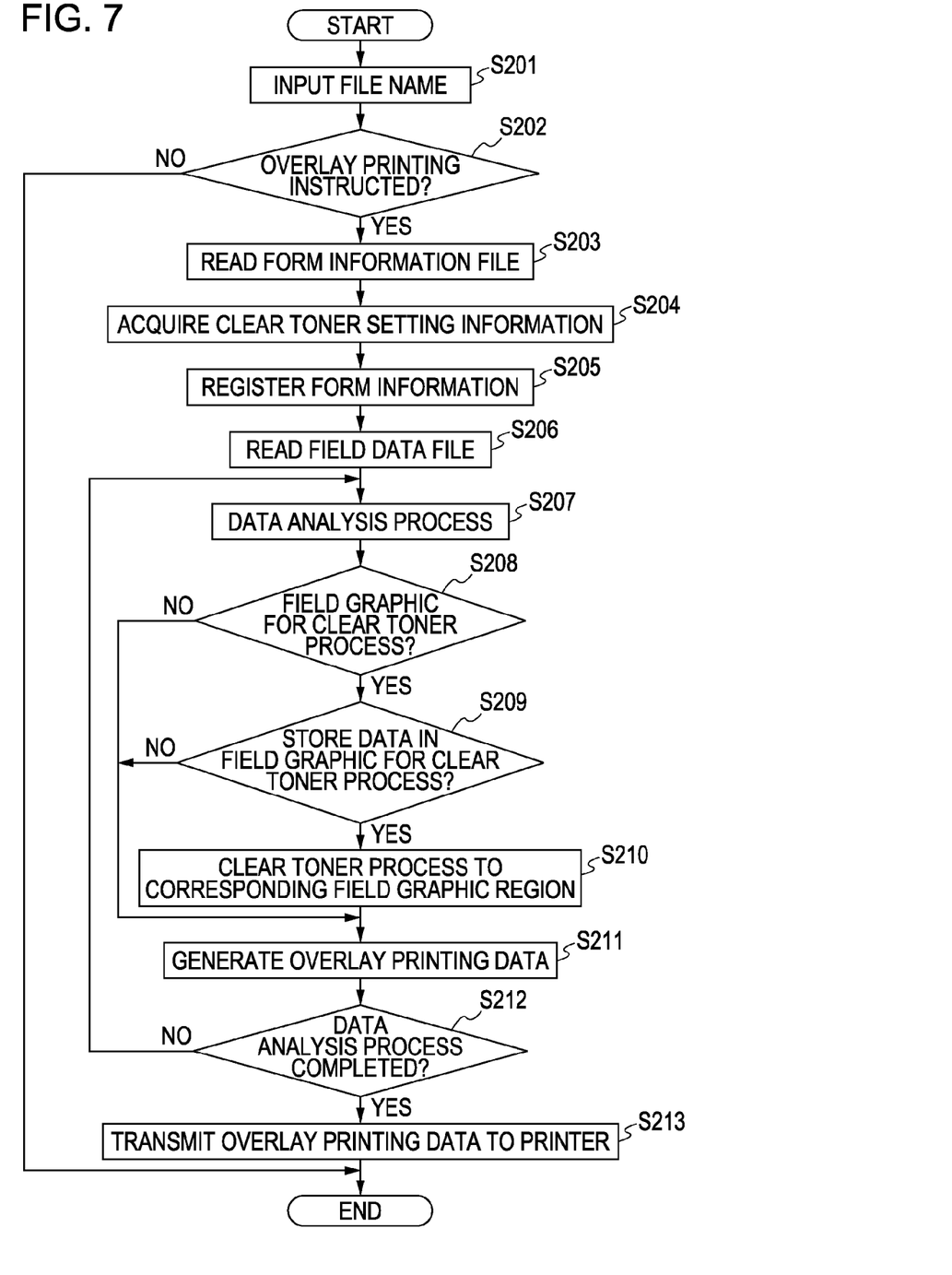
FIG. 7 is a flowchart to perform overlay printing based on the special-color recording material setting in accordance with an embodiment of the present invention.

FIG. 7 is a flowchart showing an operation procedure to perform overlay printing in accordance with the above-described special-color recording material setting, in the overlay printing system of this embodiment.

First, in step S201, the user interface 302 in FIG. 3 accepts input of the file name of the form information file 204 and the file name of the field data file 205 in text format. Then, the user interface 302 sends the input to the overlay printing controller 303.

Then, in step S202, the overlay printing controller 303 determines whether or not an overlay printing instruction has been made by the user on the basis of the input information.

In step S202, when it is determined that the overlay printing instruction has not been made (NO in step S202), the procedure is ended.

In step S202, when it is determined that the overlay printing instruction has been made (YES in step S202), the procedure goes to step S203.

In step S203, the overlay printing controller 303 reads the form information file 204 corresponding to the file name of the form information file input via the user interface 302.

Figure 5:
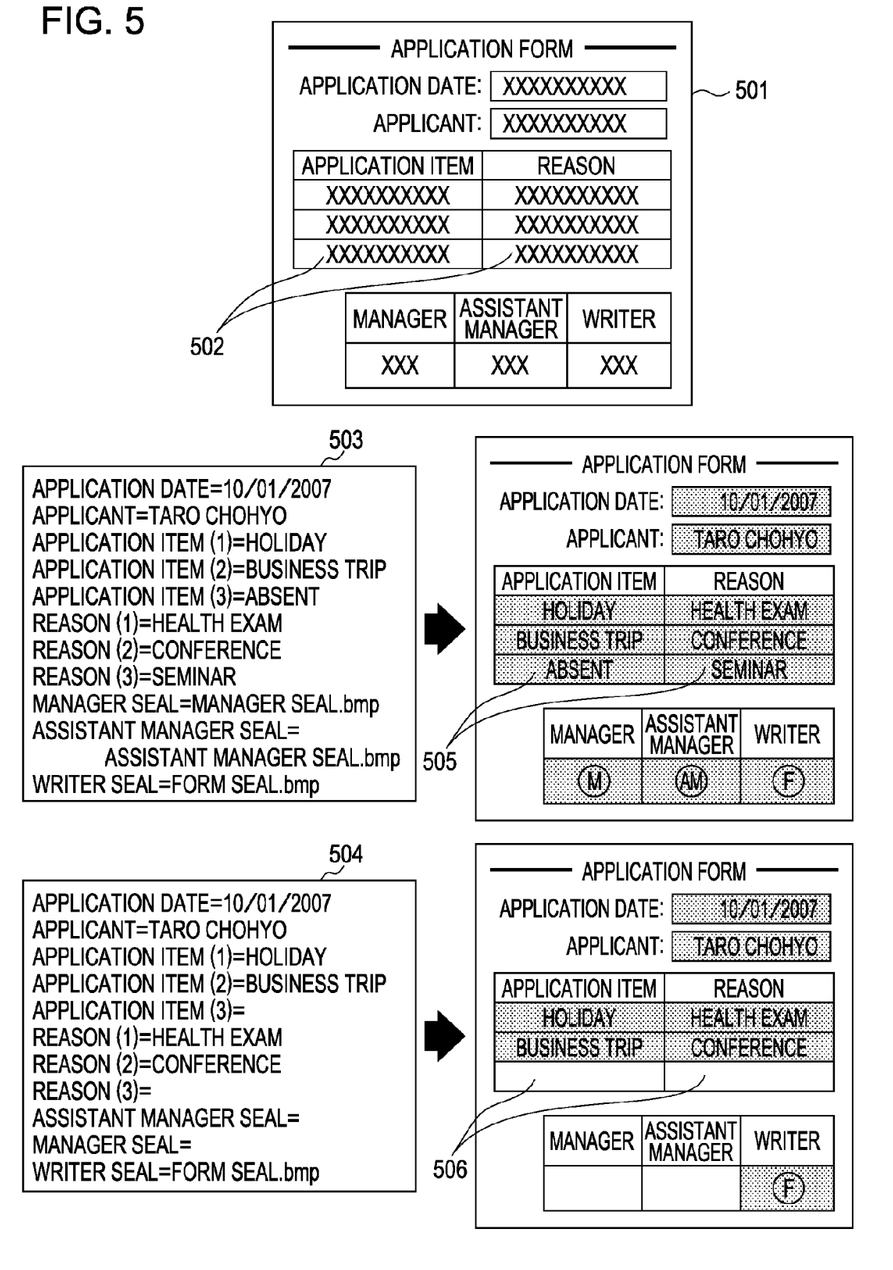
FIG. 5 illustrates an exemplary output when data is designated to a form information file with the special-color recording material setting and overlay printing is performed.

FIG. 5 illustrates a form image 501 generated on the basis of the form information file 204.

In step S204, the overlay printing controller 303 acquires the special-color recording material setting information (clear toner setting information) generated in steps S103 and S104 in FIG. 6 on the basis of the form information file 204.

Then, in step S205, the form information having the acquired special-color recording material setting information is registered on the printer 305.

Meanwhile, the user interface 302 accepts the input of the file name of the data file including data in text format serving as field data which is a written item in the form. The user interface 302 sends the input file name of the data file to the overlay printing controller 303.

In step S206, the overlay printing controller 303 reads the data file corresponding to the file name of the data file. FIG. 5 illustrates file images 503 and 504 including the field data.

Then, in step S207, a data analysis process is performed, so as to acquire data necessary for performing printing on a page from the data file.

Then, in step S208, it is determined whether or not a field graphic is present, on which recording with the special-color recording material is performed, on the basis of the special-color recording material setting information acquired in step S204.

In step S208, when it is determined that the special-color recording material setting is not provided (NO in step S208), the procedure goes to step S211. On the other hand, when it is determined that the special-color recording material setting is provided in, for example, a field graphic 502 in FIG. 5 (YES in the step S208), the procedure goes to step S209.

In this case, in step S209, the overlay printing controller 303 determines whether or not the data acquired in step S206 is to be stored in the field graphic.

That is, it is determined whether or not printing is performed on the field graphic. When it is determined that the data is not stored in the field graphic (NO in step S209), the procedure goes to step S211.

In step S209, it is assumed that the data is stored in the field graphic with the special-color recording material setting (YES in step S209).

Then, the procedure goes to step S210, in which the overlay printing controller 303 generates printing data for performing recording on the corresponding field graphic with the special-color recording material.

As shown in the file image 503 in FIG. 5, since data is designated to field graphics 502 of "application item (3)" and "reason (3)", the data is stored in the field graphics 502.

That is, characters or images are printed on the field graphics after printing.

In this case, the overlay printing controller 303 creates printing data so that recording with the special-color recording material is performed on field graphics 505.

Meanwhile, as shown in the file image 504 in FIG. 5, since data is not designated to field graphics 502 of "application item (3)" and "reason (3)", data is not stored in the field graphics 502.

That is, characters or images are not printed on the field graphics after printing.

In this case, the overlay printing controller 303 generates printing data on field graphics 506 in which the special-color recording material setting is canceled.

After such printing data is generated, in step S211, printing data is generated for performing overlay printing by overlaying the form and the field data.

Steps S207 to S211 are repeated until the data analysis process of the field data file 205 is completed (step S212).

Finally, in step S213, the printing data after overlaying is transmitted to the printer 305 via the printer driver 304.

When the printer 305 performs printing, recording with the special-color recording material is performed on a region which is the field graphic with the special-color recording material setting and on which characters or images are printed.

FIG. 5 illustrates an example output form obtained when the field data file is designated and overlay printing is performed on the form information file with the special-color recording material setting.

The field graphics 505 in FIG. 5 have the special-color recording material setting. Since the field graphics 505 have designation of data, the special-color recording material setting becomes effective, and hence, an output form is provided on which recording with the special-color recording material is performed.

In contrast, the field graphics 506 in FIG. 5 have no designation of data although the special-color recording material setting is provided.

Thus, the special-color recording material setting is canceled, and an output form is provided on which recording with the special-color recording material is not provided.

Alternatively, overlaying of the two data does not have to be performed in step S211. These printing data may be separately transmitted to a printer, and overlaying may be performed in the printer.

As described above in this embodiment, the special-color recording material is added only in the field graphic on which the data in text format is printed, from among the field graphics instructed for recording with the special-color recording material in the form.

Accordingly, since recording with the special-color recording material is provided only at the necessary region, exclusion control of an editing operation can be provided only at the necessary region.

The necessary region is a region where it is desired to prevent the editing operation such revising of the form by an unauthorized user.

Also, since the special-color recording material is added only to the necessary region, toner consumption can be reduced.

In the previous embodiment, the special-color recording material setting to a field graphic is provided via the user interface.

At this time, the content of the special-color recording material setting is saved in the form information file 204, and overlay printing is performed by designating the form information file 204.

In the present embodiment, the position and region in which recording with the special-color recording material is performed in the form of the sheet are appropriately changed depending on the authority of a user who executes printing. That is, when a certain condition is satisfied, the position and region in which recording with the special-color recording material is performed are changed.

Figure 9:
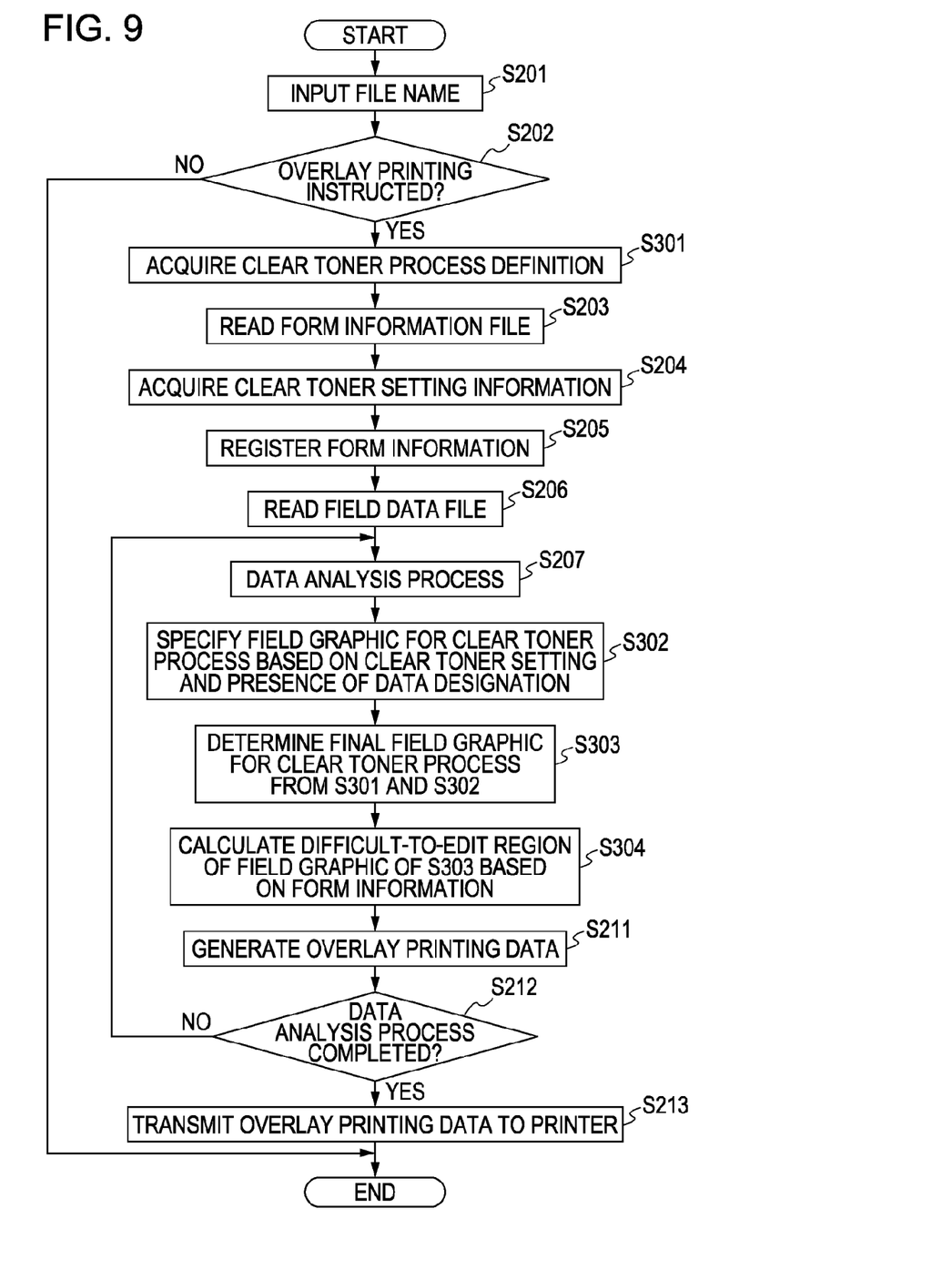
FIG. 9 is a flowchart to perform overlay printing based on the special-color recording material process definition according to an embodiment of the present invention.

FIG. 9 is a flowchart showing an operation procedure for overlay printing in an overlay printing system of the present embodiment.

Here, similar steps to those in the flowchart in FIG. 7 of the previous embodiment refer like numerals.

In the present embodiment, a form information file 204 to which recording with the special-color recording material is performed, and a field graphic in the form information file 204 are defined in advance depending on a user who executes printing (hereinafter, referred to as special-color recording material process definition).

Figure 8:
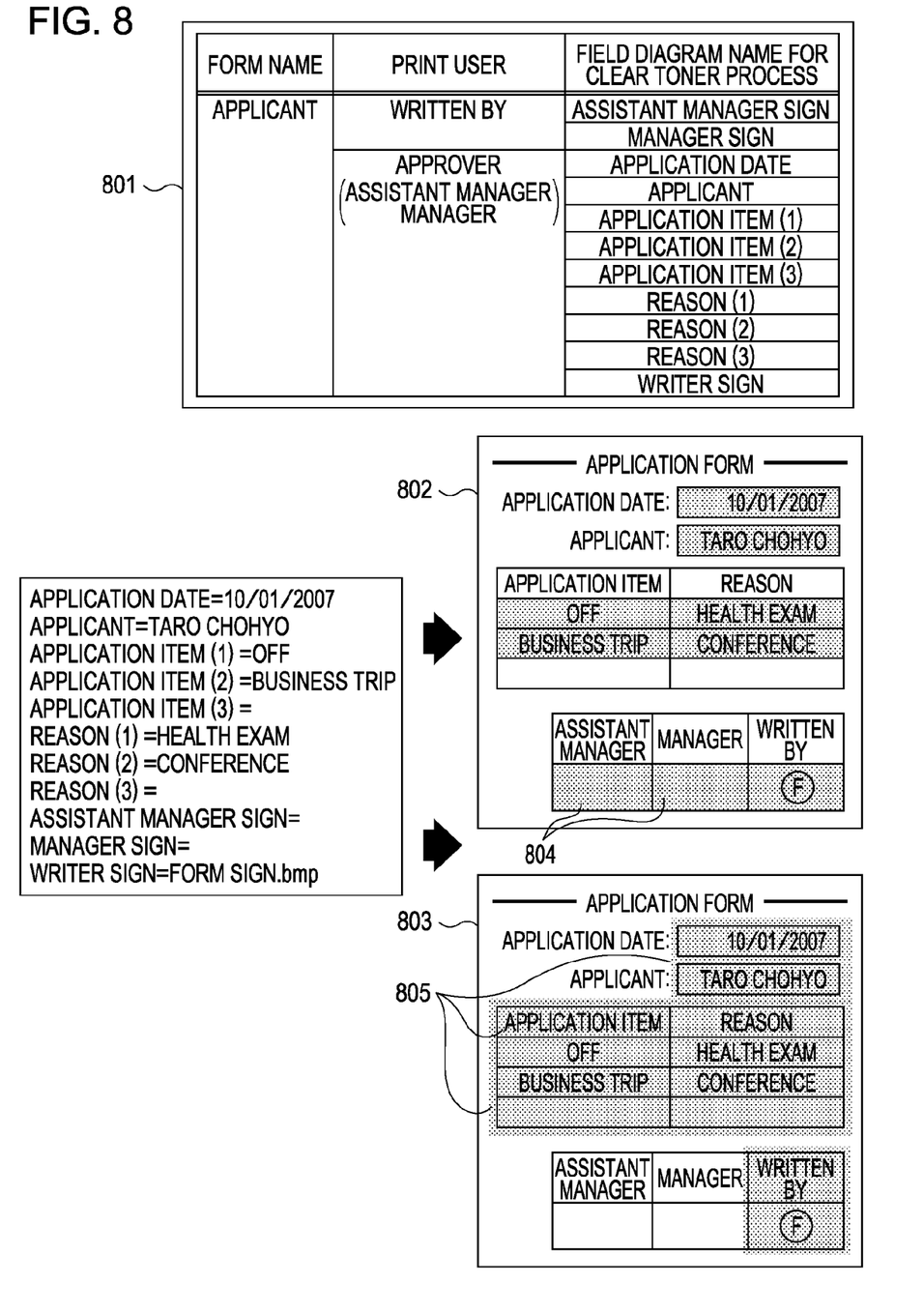
FIG. 8 illustrates an exemplary special-color recording material process definition and an exemplary output when data is designated to a form information file with the special-color recording material setting, and overlay printing is performed in accordance with the special-color recording material process definition.

FIG. 8 shows a special-color recording material process definition 801.

For example, when the user who executes printing is a form writer, the form writer does not have authority to fill spaces of a manager seal and an assistant manager seal.

Hence, when the form writer performs printing, a special-color recording material process definition for a form writer is applied. Even when data is not designated to the field graphics for the manager seal and the assistant manager seal, and hence even when data is not stored in the field graphics, the special-color recording material setting is not canceled.

In step S202, when it is determined that the overlay printing instruction is made by the user, the overlay printing controller 303 acquires the special-color recording material process definition, as information (step S301).

By referring to a logged-in user name of an information processing apparatus or a printer which is a source of transmitting a print instruction, the user who executes printing is recognized. Accordingly, the information relating to the special-color recording material process definition can be acquired.

The overlay printing controller 303 acquires the special-color recording material setting information from the form information file 204, and data necessary for performing printing on a page generated by the data analysis process of the data file (steps S203 to S207).

Then, the overlay printing controller 303 specifies field graphics on which recording is performed with the special-color recording material on the basis of the special-color recording material setting and the presence of designation for data writing (step S302).

Then, in step S303, a field graphic, on which recording with the special-color recording material is finally performed, is determined on the basis of the special-color recording process definition acquired in step S301 and the field graphics for recording with the special-color recording material specified in step S302.

Further, printing data is generated so that a character or image printed in the field graphic determined in step S303 is not to be edited by an arbitrary user.

In step S304, a field graphic region and a region including a peripheral region of the field graphic region are calculated on the basis of layout position information for the field graphic saved in the form information file 204.

Now, description is given so that the calculated region includes the peripheral region of the field graphic region.

When the record in the field graphic region is to be corrected, the record in the field graphic is corrected using a correction mark or a double line, and a new record may be provided at a position outside the field graphic region.

When the special-color recording material is added (recorded) only in the field graphic region, the special-color recording material is not added in the peripheral region of the field graphic region. By using the above-described correction method, the record may be tampered using the peripheral region.

To avoid such tampering, the special-color recording material has to be added to the peripheral region outside the field graphic region.

Therefore, a region relating to correction of a writing item in field data is discriminated from among a peripheral region of the field graphic region.

At this time, a certain peripheral range of the field graphic region may be merely discriminated. Alternatively, a "difficult-to-edit region" in which editing is difficult described in S304 in FIG. 9 may be discriminated.

The "difficult-to-edit region" is a region which is difficult to be written for correction because printing is already performed in the region, such as an output form 803 in FIG. 8 indicated by "application date" and "applicant".

The special-color recording material setting is not provided even in the peripheral region around the field graphic.

The setting of the peripheral range may be determined on the basis of a value previously set by the user, or may be automatically determined depending on the size of a character to be printed on the sheet.

In this case, the special-color recording material may be added to the peripheral region around the field graphic and having a width corresponding to a character to be printed on the sheet.

Then, the overlay printing controller 303 generates printing data for performing recording on the region with the special-color recording material.

FIG. 8 illustrates an output form 802 when the user who executes printing is a "form writer".

For example, when the form writer outputs a form including the filed graphics 506, a test print may be tampered.

To prevent this, the special-color recording material is added to fields to which the manager seal and the assistant manager seal are printed as illustrated in the output form 802.

At this time, the recording material to be added does not have to be the special-color recording material, and may be any recording material as long as the recording material inhibits input to the field data.

A transparent toner, such as a clear toner, does not have to be used in a region to which printing is not performed in a field data.

Field graphics 804 in FIG. 8 are to be recorded with the special-color recording material by the special-color recording material process definition regardless of the presence of the designation for data writing. The special-color recording material setting of the field graphics 804 is effective, and hence, recording with the special-color recording material is performed.

Accordingly, an editing operation of an item to be inputted by an "approver" is not inputted by a "form writer". Such a writing region can be protected.

FIG. 8 illustrates an output form 803 when the user who executes printing is an "approver".

Field graphics 805 in FIG. 8 are to be recorded with the special-color recording material by the special-color recording material process definition regardless of the presence of the designation for data writing.

Hence, the special-color recording material setting is effective, and recording with the special-color recording material is performed.

Accordingly, information written by the "form writer" is not edited or corrected by the "approver". The writing region can be protected.

In this case, the entire region including the peripheral region of the field graphics is recorded with the special-color recording material.

The special-color recording material used in the present embodiment may be a recording material, such as a transparent toner or ink, like a clear toner, in a similar manner to the previous embodiment.

Field data, to which printing is not performed but the special-color recording material is added by the authorized user, may use an opaque recording material.

In the present embodiment, the position and region in the form to be recorded with the special-color recording material is determined depending on a user.

Hence, the data in the output form can be efficiently prevented from being unintentionally edited or revised.

Modifications

A processing method of storing a program in a computer-readable storage medium is included within the scope of any of the above-described embodiments, the program operating the configuration of any of the above-described embodiments to attain the function of the embodiment; reading the program stored in the storage medium as codes; and executing the codes by a computer. The storage medium may store the program. Alternatively, the program may be included in any of the above-described embodiments.

Such a computer-readable storage medium may be, for example, a floppy (registered trademark) disk, hard disk, an optical disk, a magneto-optical disk, a CD-ROM, a magnetic tape, a nonvolatile memory card, or a ROM.

In addition to a configuration in which the processing is executed only with the program stored in the above-described storage medium, a configuration in which a program runs on an OS to execute the operation of the embodiments in association with other software or a function of an expansion board may be included within the scope of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-061287 filed Mar. 11, 2008, which is hereby incorporated by reference herein in its entirety.

What is claimed is:

1. A recording method comprising:
providing setting of recording with a special-color recording material in a designated region of a sheet, the designated region is a region where only print content is to be printed;
determining whether the designated region with the special-color recording material setting is a region in which printing is performed;
recording the special-color recording material to the designated region where it is determined that the printing is to be performed, in accordance with the setting; and
canceling the setting of the designated region if it is determined that printing is not performed for the designated region and preventing the special-color recording material from being recorded on the designated region in which printing is not performed.

2. The recording method according to claim 1, wherein the sheet is a form, and
wherein the designated region is a minimum unit in which the setting of the recording with the special-color recording material can be provided.

3. The recording method according to claim 1, wherein, when printing is to be executed with the setting, a position in the sheet, at which the recording with the special-color recording material is performed, and a size of the designated region are changed only if a predetermined condition is satisfied.

4. The recording method according to claim 3, wherein the predetermined condition is authority of a user who executes the printing.

5. The recording method according to claim 1, wherein the special-color recording material is a transparent recording material.

6. The recording method according to claim 2, wherein the special-color recording material is a transparent recording material.

7. The recording method according to claim 3, wherein the special-color recording material is a transparent recording material.

8. An information processing apparatus comprising:
a special-color recording material setting unit configured to provide setting of recording with a special-color recording material in a designated region of a sheet, the designated region is a region where only print content is to be printed;
a printing determining unit configured to determine whether or not the designated region with the special-color recording material setting is a region in which printing is performed;
a special-color recording material recording unit configured to add the special-color recording material to the designated region where it is determined by the printing determining unit such that the printing is to be performed, in accordance with the setting provided by the special-color recording material setting unit; and
a special-color recording material setting canceling unit configured to cancel the special-color recording material setting of the designated region if it is determined that printing is not performed for the designated region and preventing the special-color recording material from being recorded on the designated region in which printing is not performed determined by the printing determining unit such that the printing is not performed, the setting provided by the special-color recording material setting unit.

9. The information processing apparatus according to claim 8,
wherein the sheet is a form, and
wherein the designated region is a minimum unit in which the setting of the recording with the special-color recording material can be provided by the special-color recording material setting unit.

10. The information processing apparatus according to claim 8, wherein, when printing is to be executed with the setting, a position in the sheet, at which the recording with a clear toner is performed, and a size of the designated region are changed by the special-color recording material setting unit only if a predetermined condition is satisfied.

11. The information processing apparatus according to claim 10, wherein the predetermined condition is authority of a user who executes the printing.

12. The information processing apparatus according to claim 8, wherein the special-color recording material is a transparent recording material.

13. The information processing apparatus according to claim 9, wherein the special-color recording material is a transparent recording material.

14. The information processing apparatus according to claim 10, wherein the special-color recording material is a transparent recording material.

15. A non-transitory computer-readable storage medium containing computer-executable instructions for controlling an information processing apparatus that provides setting of recording, the medium comprising:
  computer-executable instructions that provide setting of recording with a special-color recording material in a designated region of a sheet, the designated region is a region where only print content is to be printed;
  computer-executable instructions that determine whether the designated region with the setting is a region in which printing is performed;
  computer-executable instructions that record the special-color recording material to the designated region where it is determined such that the printing is to be performed, in accordance with the setting; and
  computer-executable instructions that cancel the setting of the designated region if it is determined that printing is not performed for the designated region and preventing the special-color recording material from being recorded on the designated region in which printing is not performed determined such that the printing is not performed.

* * * * *